March 13, 1956 — J. W. SPEARS — 2,738,201
PLATFORM TRUCK
Filed Oct. 29, 1951 — 4 Sheets-Sheet 1
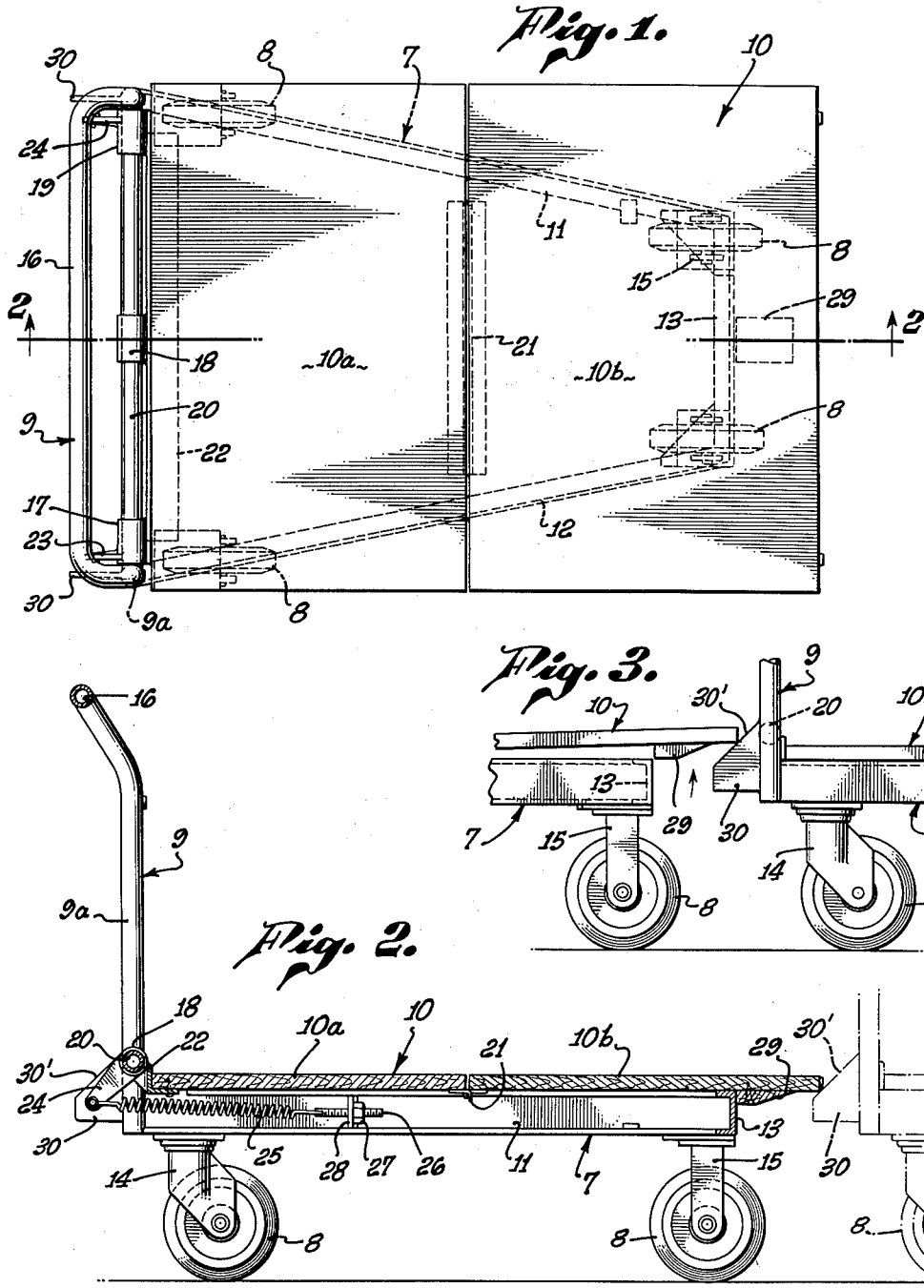
INVENTOR.
JESS W. SPEARS,
BY Paul A. Weilein
ATTORNEY.

March 13, 1956   J. W. SPEARS   2,738,201
PLATFORM TRUCK

Filed Oct. 29, 1951   4 Sheets-Sheet 2

JESS W. SPEARS,
INVENTOR.

BY
Paul A. Weilein
ATTORNEY

March 13, 1956　　　J. W. SPEARS　　　2,738,201
PLATFORM TRUCK
Filed Oct. 29, 1951　　　　　　　　4 Sheets-Sheet 3
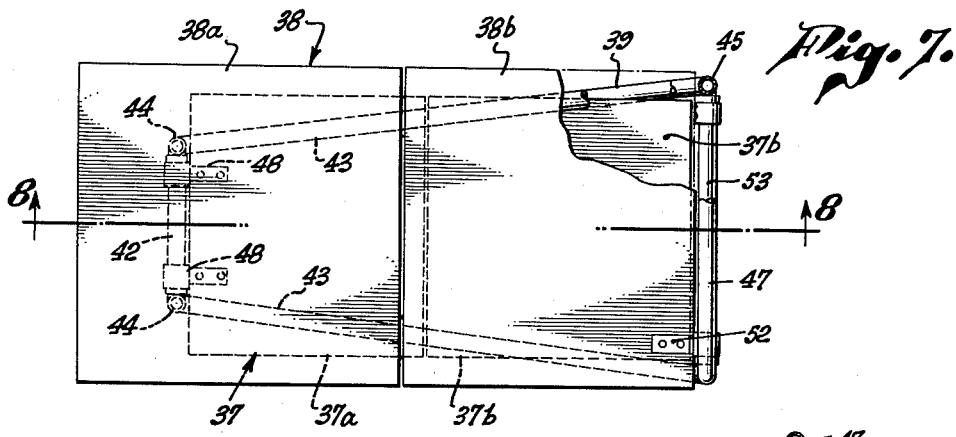
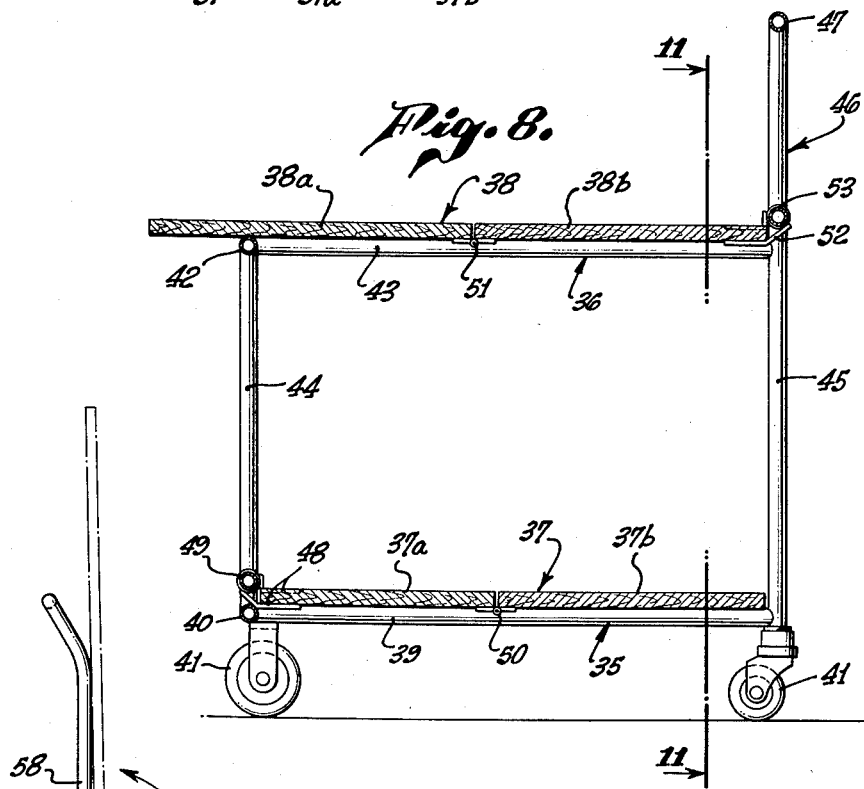
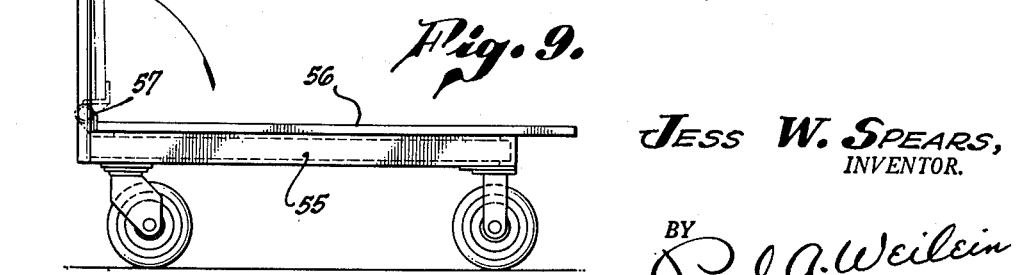
Jess W. Spears,
INVENTOR.
BY Paul A. Weilein
ATTORNEY.

March 13, 1956  J. W. SPEARS  2,738,201
PLATFORM TRUCK
Filed Oct. 29, 1951  4 Sheets-Sheet 4
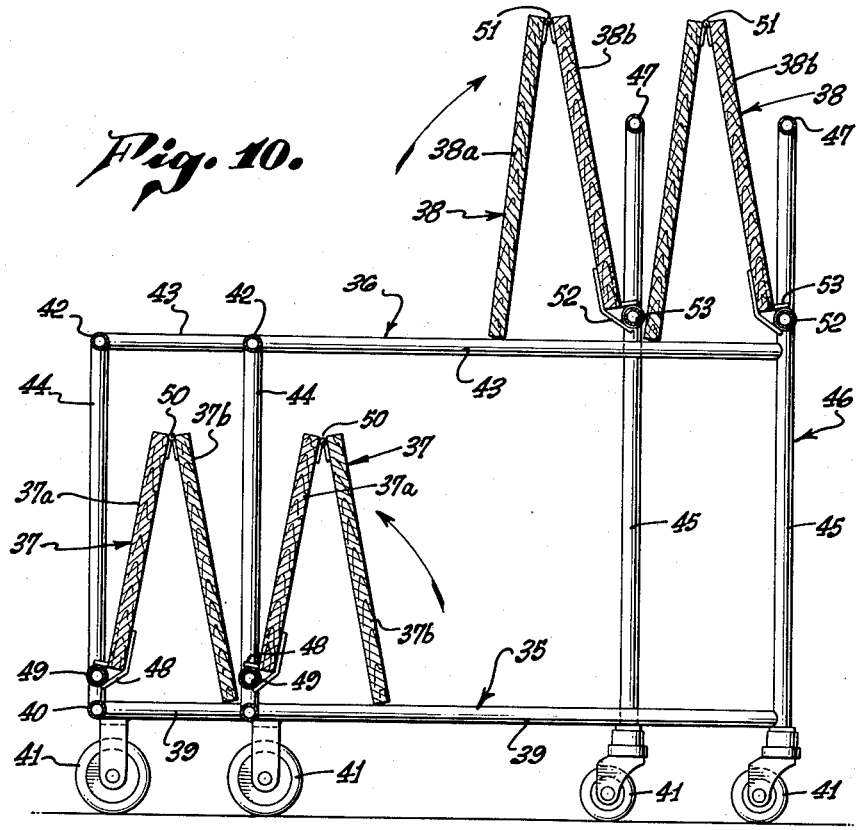
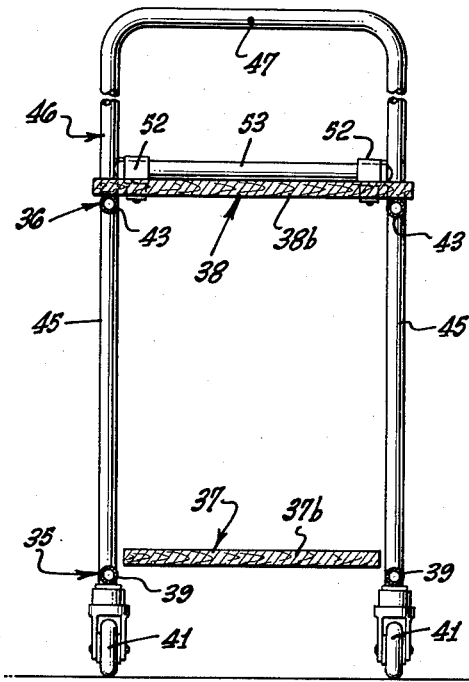
Jess W. Spears,
INVENTOR.
BY Paul A. Weilein
ATTORNEY.

United States Patent Office 2,738,201
Patented Mar. 13, 1956

2,738,201

PLATFORM TRUCK

Jess W. Spears, Alhambra, Calif., assignor to George M. Prescott, Los Angeles, Calif.

Application October 29, 1951, Serial No. 253,639

5 Claims. (Cl. 280—33.99)

This invention relates to platform trucks, particularly the type propelled by hand for transporting boxes, cartons, and other loads in warehouses and on loading platforms, docks and similar places.

Platform trucks heretofore used have required storage space substantially equivalent to the size of each truck, with the result that where a number of these trucks are stored, a great deal of space, otherwise useful for regular storage purposes, is taken up.

It is therefore an object of this invention to provide an improved platform truck which is constructed so that a plurality thereof may be nested together in small compass to conserve storage space.

It is another object of this invention to provide a platform truck which is constructed in a manner permitting two or more of the trucks to be quickly and easily nested in small compass by simply moving the trucks, when in alignment, one into the other.

It is a further object of this invention to provide a platform truck such as described, wherein the truck bed is connected with a wheel-supported frame for movement between a position of use and an upended position adjacent one end of the frame, to facilitate the nesting of two or more of the trucks.

It is an additional object of this invention to provide a platform truck such as described, wherein the truck bed is automatically latched in position of use incident to being moved into such position and automatically released when initially engaged and moved by another truck aligned and in contact therewith, at the beginning of the movement of the trucks as required to nest them.

It is a further object of this invention to provide a platform truck such as described, wherein a spring means assists in moving the truck bed into position permitting the trucks to be nested, incident to the release of the latch means.

It is another object of this invention to provide a platform truck having a plurality of vertically spaced platforms mounted for movement between a position of use and a position permitting two or more of such trucks to be nested in small compass.

It is an additional object of this invention to provide a platform truck of the character described which will provide the advantages herein noted without sacrifice of the desired rigidity, strength, durability and load capacity as provided in platform trucks heretofore employed.

This invention possesses many other advantages and has other objects which may be made more easily apparent from a consideration of several embodiments of the invention. For this purpose there are shown a number of forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 1 is a top plan view of a platform truck embodying the present invention, as it would appear when ready for use;

Fig. 2 is a longitudinal sectional view taken on the line 2—2 of Fig. 1, showing in dot-dash lines an end portion of a second truck in position for movement of the two trucks into nested relation;

Fig. 3 is a fragmentary side elevation of portions of two of the trucks of this invention, showing how one of the trucks contacts and moves the bed of the other truck to release the latch means in the operation of nesting the trucks;

Fig. 7 is a top plan view of a modified form of the present invention;

Fig. 8 is a longitudinal sectional view taken on the line 8—8 of Fig. 7;

Fig. 9 is a side elevation of another modified form of this invention;

Fig. 10 is a longitudinal sectional view showing in nested position a plurality of trucks of the type shown in Fig. 7; and Fig. 11 is a cross sectional view taken on the line 11—11 of Fig. 8.

Figure 4:
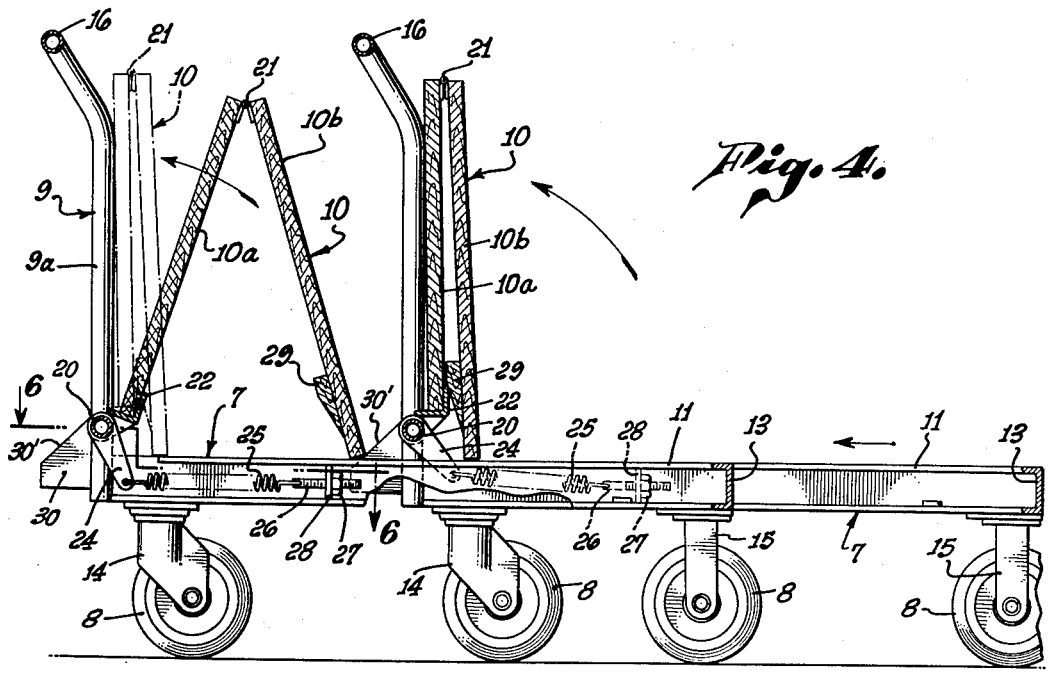
Fig. 4 is a longitudinal sectional view taken through two of the trucks in the positions assumed during the nesting thereof.

Referring to the drawings more specifically, it will be seen that one embodiment of this invention generally comprises a truck frame 7, pairs of wheels 8 supporting the frame, and an upright handle 9 at one end of the frame. A truck bed 10 is connected with the frame 7 for movement between a position of use, supported flatwise on the frame, and an upended position to permit of nesting of two or more of the trucks as will be hereinafter fully described.

Figure 5:
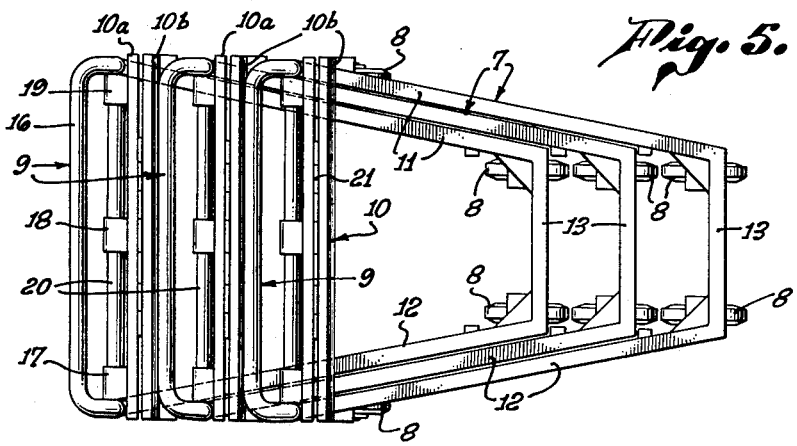
Fig. 5 is a top plan view of a plurality of the trucks in fully nested position.
Figure 6:
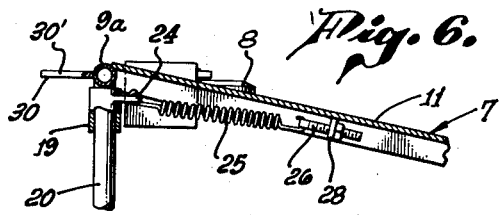
Fig. 6 is a detail section taken on the line 6—6 of Fig. 4, showing in top plan the spring means for assisting in the movement of the truck bed into upended position.

The frame 7 is generally U-shaped, being open at one end and constructed so that two or more of the trucks may be nested one within the other, as shown in Fig. 5. Thus, the frame includes opposed side members 11 and 12 in the form of channels, joined by means of an end member 13 also of channel form. The side members 11 and 12 converge toward the end member 13 whereby the frame is tapered, that is, progressively decreased in width from the wider open end to the narrower end. As the converged side members 11 and 12 are unconnected therebetween except where joined by the end member 13, it is apparent that the frames of two or more of the trucks of this invention may be nested in small compass one within the other.

The wheels 8 of the pair at the wider and open end of the frame are in the form of casters, being supported by swivel mountings 14 fixed to the free ends of the side members 11 and 12. The wheels 8 of the other set at the narrower end of the frame are mounted on fixed supports 15 depending from the side member 11 and 12.

The upstanding handle 9 is of an inverted U-shape and has its ends welded or otherwise secured to the ends of the side members 11 and 12 at the open end of the frame. At its upper end this handle is offset as at 16 to facilitate the gripping thereof and the manipulation of the truck.

In the present form of this invention the truck bed 10 is rectangular and arranged to rest in position of use upon the side members 11 and 12, and the end member 13, being extended beyond the latter.

One end of the bed 10 is secured by means of hinges 17, 18 and 19 to a cross member 20 fixed to the sides 9a of the handle 9 at a point above the frame 7, thereby providing for movement of the bed into and out of position of use.

As here shown, the bed 10 is made of sections 10a and 10b hingedly connected as at 21 so that the bed will break upwardly at the center, as shown in Fig. 4, in being swung on the hinges 17, 18 and 19 into upended position. The end edge of the bed section 10b will rest upon the side members 11 and 12 as shown in Fig. 4, when the bed 10 is moved into upended position thereby holding the bed in upended position. Moreover, the folded bed may be swung on its hinges into the inclined position shown in Fig. 4, against the handle 9, whereby it will be restrained against swinging downwardly from such position.

It will now be apparent that when two trucks made in accordance with this invention are brought into alignment, with the wider, open end of the frame 7 of one truck opposed to the narrower end of the frame 7 of the other truck as shown in Fig. 2, the nesting of the trucks may be accomplished by upending the beds 10 of the two trucks and moving one truck toward the other or by moving the trucks together.

In nesting the first two trucks, the operator may move the truck beds of both trucks into upended position, as shown in Fig. 4, by hand, and thereafter upend the bed of each truck as it is moved into nested relation to the previously nested trucks.

As here shown, spring means may be employed to assist in the folding of the truck bed 10 into upended position. For this purpose the hinges 17, 18, 19 are mounted to turn freely on the cross member 20 and are fixed in any suitable manner to an angle member 22 secured to the adjacent end of the bed 10 as shown in Fig. 2. The end hinges 17 and 19 are provided with crank arms 23 and 24 to which are secured retractile springs 25 fastened to the side members 11 and 12 of the frame 7. The tension of these springs may be regulated as desired by means of adjusting screws 26 and nuts 27 which secure the springs to lugs 28 depending from the side members 11 and 12.

In order to hold the bed 10 in position of use so that it will not accidentally fold up under the force of the springs 25, a latch member 29 here shown in the form of a cleat, is secured upon the under side of the bed 10 adjacent the free end thereof so as to abut the outer face of the cross member 13 of the frame 7, as shown in Fig. 2.

As a means for lifting the bed 10 to release the latch member 29 and which may be operated for folding the bed into upended position, a pair of projections 30 are fixed to the lower end portions of the sides 9a of the handle 9 and project outwardly therefrom. These projections have inclined upper edges 30' which intersect the plane of the bed, being thereby disposed as shown in Figs. 2 and 3, to engage the edge of the free end of the bed 10 of another truck and to lift this bed as shown in Fig. 3, to move the latch above the truck frame in the operation of nesting the trucks.

When the latch cleat 29 is lifted free of the cross member 13 as shown in Fig. 3, the springs 25 operate through the crank arms 23 and 24, to raise the bed 10 and cause the sections 10a and 10b to fold on the hinge connection 21 thereof, as two trucks are being nested in the manner hereinbefore described. Thus, the springs 25 assist in the upending of the truck bed of the truck into the frame of which another truck is being nested.

It is preferable that the spring means be tensioned to but partially move the bed 10 into upright position, to avoid the slamming of the bed into completely folded position.

It should be noted that after the springs 25 have raised the bed 10 of one truck, for example, the extent shown in full lines in Fig. 4, continued nesting movement will cause the projections 30 on the other truck to contact the lower end of the section 10b of the bed and move the bed into the fully upended position shown in dotted lines. However, if desired the operator may move the bed 10 by hand past the position into which it is moved by the springs, or may effect the complete movement of the bed into full upended position without depending upon the latch releasing projections 30 and the springs 25.

A modified form of this invention shown in Figs. 7, 8, 10 and 11 comprises a truck having a pair of vertically spaced, horizontally disposed frames 35 and 36 supporting truck beds 37 and 38, the frames and beds being arranged so that two or more of these trucks may be nested in small compass as shown in Fig. 10.

The lower frame 35 is formed of a pair of opposed side members 39 which extend divergently from an end member 40 of the frame. Thus, the frame is open at the end opposite the member 40 whereby the frames of two or more trucks may be nested one within the other.

Pairs of wheels 41 corresponding in construction and arrangement to the wheels 8, support the lower frame 35. The upper frame 36 is of substantially the same construction and dimensions as the lower frame having an end member 42 and opposed side members 43 extending divergently from the member 42.

The upper frame 36 is supported at one end by means of a pair of posts 44 disposed between and fixed as by welding to the frames 35 and 36 at the joints of the side and end members of such frames. The other ends of the frames are supported by the opposed upright portions 45 of an inverted U-shaped handle member 46. These upright portions are welded or otherwise fixed to the free ends of the side members of the upper and lower frames and extend above the upper frame. The cross portion 47 at the upper ends of the upright portions 45 is disposed in position for convenient gripping to manipulate the truck.

The lower bed 37 is connected at one end by means of hinges 48 to a cross bar 49 secured to and between the posts 44 above the plane of the upper side of the lower frame 35. Formed of two sections 37a and 37b, joined by a hinge 50, the lower bed 37 may be folded on the hinge 50 and swung on the hinges 48 toward the posts 44 to upended position as shown in Fig. 10.

The upper bed 38 is formed of two sections 38a and 38b, hinged one to the other as at 51 with the section 38b connected by means of hinges 52 to a cross bar 53 on the handle 46. Thus, the sections of upper bed 38 are arranged to be upended adjacent the handle 46 at the wider end of the upper frame 36, whereas, the sections of the lower bed 37 are arranged to be upended adjacent the posts 44 at the narrow end of the lower frame 35 as shown in Fig. 4.

It should be noted that if desired, the upper bed 38 may be of greater length and width than the lower frame as shown in Fig. 7, the dimension of the lower bed 37 being of course limited due to the posts 44 and upright portions of the handle 46.

As shown in Fig. 10, two or more of the double-bed trucks may be nested in small compass, by moving them together after swinging the beds 37 and 38 into the upended positions shown in Fig. 10. However, the beds may be swung into out of the way position during the movement of the trucks into nested relation. The free ends of the bed sections 37b and 38a will rest upon the frames 35 and 36 respectively to hold the bed sections in upended position as shown in Fig. 10.

Another modified form of this invention as shown in Fig. 9 comprises a wheel-supported frame 55 corresponding to the frame 7 but which supports a one piece bed 56 hinged to a cross member 57 on the handle 58 at the open and wider end of the frame. This form of truck is adapted to be nested in the same manner as the first described form, the one piece bed being lifted to upright position as indicated in dotted lines to make possible the nesting of two or more of these trucks. When thus lifted and swung against the handle 58 the bed 56 is inclined and restrained from unintentional swinging back onto the frame.

I claim:

1. A platform truck including a wheel-supporting frame fixed in a horizontal position and open across one end between opposed side members thereof extending convergently from said open end; a truck bed, means pivotally connecting said bed with said frame for movement between a position of use on said frame and an up-ended position relative to said frame, spring means urging said bed into up-ended position, and means restraining movement of the bed into up-ended position, releasing said bed upon predetermined lifting of the bed from said position of use.

2. A platform truck including a wheel-supported frame fixed in a horizontal position and open across one end between opposed side members thereof extending convergently from said open end; a truck bed, means pivotally connecting said bed with said frame for movement between a position of use on said frame and an up-ended position relative to said frame adjacent said open end, means urging said bed toward up-ended position, and a latch member on said bed engageable with said frame to releasably restrain movement of the bed from position of use, said latch member releasing said bed upon predetermined movement of the bed from said position of use.

3. A platform truck including a wheel-supported frame open across one end between opposed side members thereof extending convergently from said open end; a truck bed, means connecting said bed with said frame for movement between a position of use on said frame and an up-ended position adjacent said open end, latch means on said bed engageable with said frame to restrain movement of the bed from position of use, means on said frame forming a surface for contacting and lifting the bed of a like truck to release the latch means, and spring means operable to move said bed toward said up-ended position on release of said latch means.

4. A platform truck including a wheel-supported frame open across one end, a truck bed formed of sections hinged to fold upwardly, and means connecting one of said sections with one end of said frame, permitting movement of said bed between a position of use and an up-ended position on the frame, cooperable means on said bed and said frame for releasably holding the bed in position of use, spring means urging said bed into said folded position on release of said holding means, and means at the open end of the frame projecting outwardly therefrom and forming inclined surfaces which intersect the plane of said bed when the latter is in position of use.

5. In a platform truck including a wheel-supported frame open across one end, a truck bed formed of sections hinged one to the other to fold upwardly, hinges connecting one of said sections with said frame permitting said sections to be swung between a position lying flatwise on the frame and a position upended thereon, crank arms connected with said hinges, and springs connected with said crank arms and said frames for urging said sections into said upended position.

References Cited in the file of this patent

UNITED STATES PATENTS

| Number | Name | Date |
|---|---|---|
| 1,919,063 | Hubbard | July 18, 1933 |
| 2,141,881 | Schray | Dec. 27, 1938 |
| 2,198,572 | Cross | Apr. 23, 1940 |
| 2,212,053 | Smith | Aug. 20, 1940 |
| 2,334,749 | Burr | Nov. 23, 1943 |
| 2,479,530 | Watson | Aug. 16, 1949 |
| 2,572,780 | Tackenberg | Oct. 23, 1951 |
| 2,583,513 | Maslow | Jan. 22, 1952 |
| 2,596,250 | Klingler | May 13, 1952 |
| 2,596,686 | Hess | May 13, 1952 |
| 2,644,695 | Enders | July 7, 1953 |